UNITED STATES PATENT OFFICE.

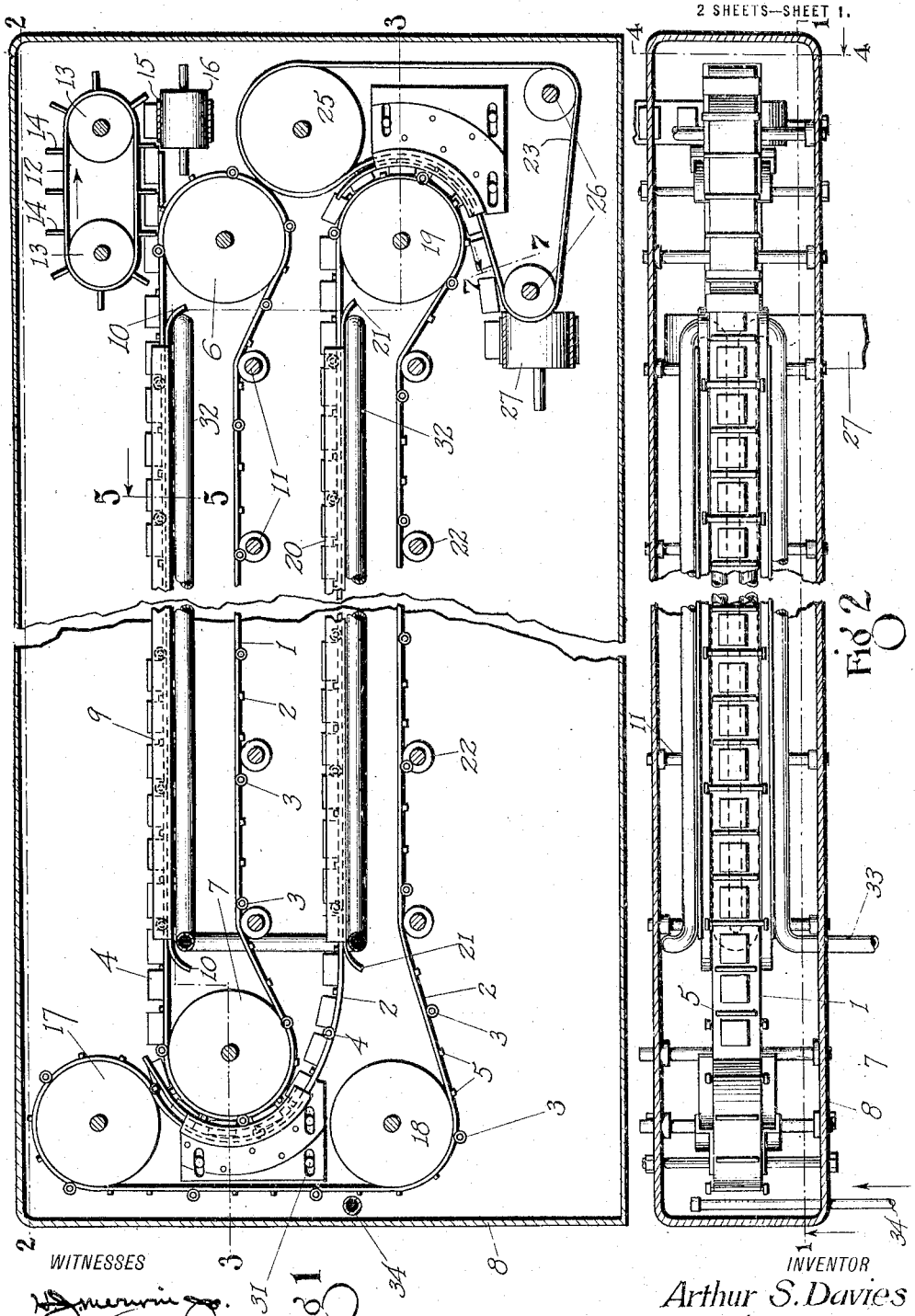

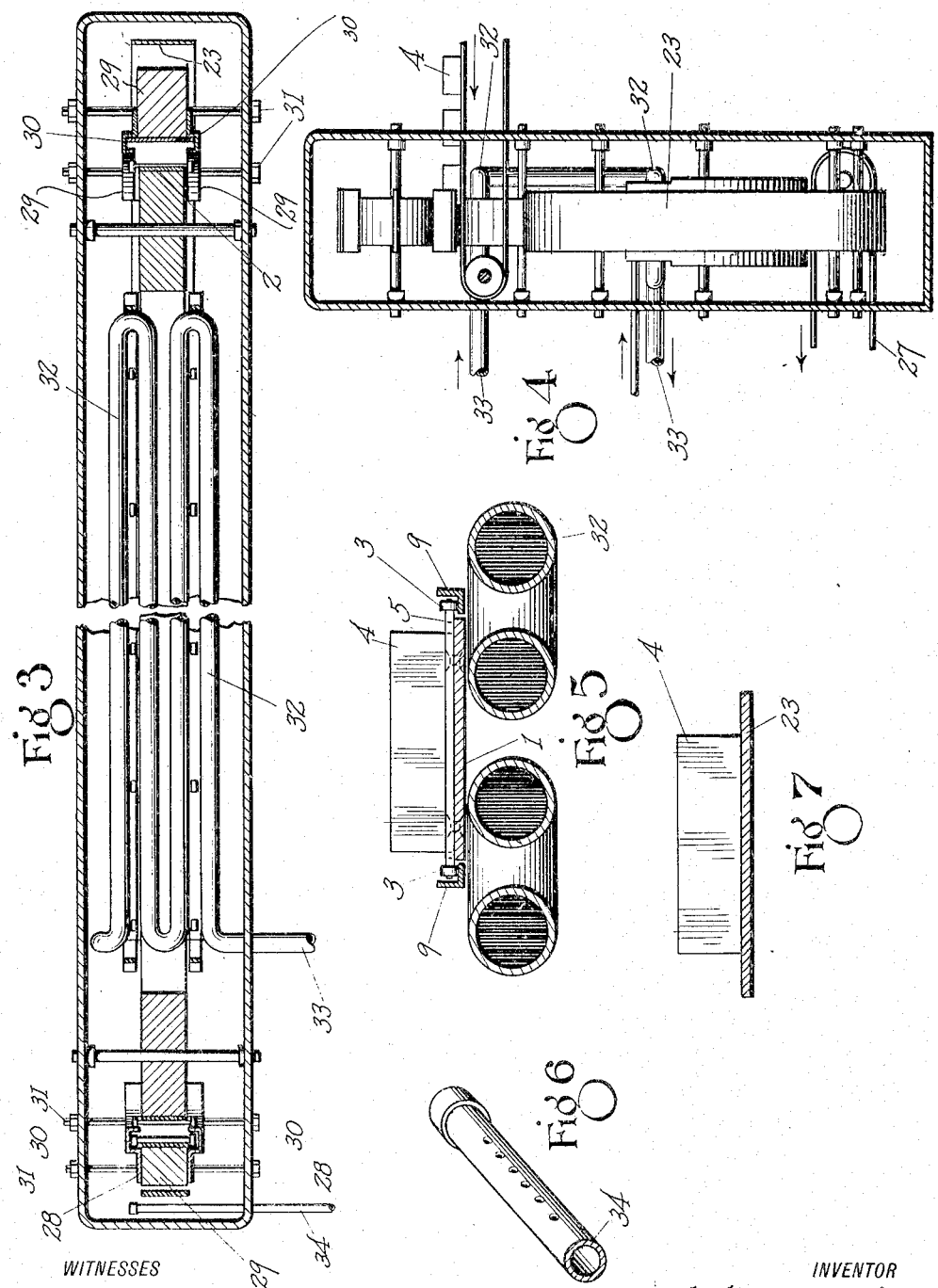

ARTHUR SCOVILL DAVIES, OF SANTA CRUZ, CALIFORNIA.

MACHINE FOR COOKING AND DRAINING MATERIAL IN CANS.

1,355,091.     Specification of Letters Patent.     Patented Oct. 5, 1920.

Application filed January 2, 1920. Serial No. 348,960.

*To all whom it may concern:*

Be it known that I, ARTHUR SCOVILL DAVIES, a citizen of the United States, and a resident of Santa Cruz, in the county of Santa Cruz and State of California, have invented certain new and useful Improvements in Machines for Cooking and Draining Material in Cans, of which the following is a specification.

My invention is an improvement in machines for cooking and draining material in cans, prior to covering and sealing, as for instance fish wherein the cans containing the material are moved continuously during the heating and draining, and are inverted to drain, and are finally delivered in upright condition.

In the drawings:

Figures 1 and 4 are sections on the lines 1—1 and 4—4 respectively of Fig. 2,

Figs. 2, 3, 5 and 7 are sections on the lines 2—2, 3—3, 5—5, and 7—7 respectively of Fig. 1, Fig. 6 is a perspective view of a portion of the steam pipe.

In the present embodiment of the invention a plurality of endless carriers or belts 1 and 2 is provided, each of the said carriers consisting of an endless belt having transverse stops 5 for properly spacing the cans 4 on the belt.

The carrier 1 is supported by a pair of rollers 6 and 7, journaled in spaced relation, in an inclosing casing 8 for the machine, the rollers having shafts which are journaled in the sides of the casing. The upper run of the carrier moves on guiding angle plates 9, which are supported between the rollers 6 and 7, the said angle plates having their side walls cut away at the ends, and the ends are curved downward as shown at 10. These angle plates are arranged on opposite sides of the belt, and sundry of the stop bars 5 are extended beyond the belts as shown in Fig. 1, and have wheels 3 journaled upon their ends which run upon the angle plates. The lower run of the carrier is supported by tension and guiding rollers 11, the rollers tensioning the carrier and being journaled at a higher level than the normal plane of the said run.

The cans are fed to the upper run of the carrier 1, by a feeding belt 12. This belt 12 is supported by rollers 13 journaled in the casing 8, and it will be noticed that the said belt whose lower run is parallel with the upper run of the carrier 1 is provided with transverse vanes 14 at suitable intervals, the said vanes being spaced apart a distance slightly greater than the length of the cans. The cans are fed to the feeding belt, by an endless conveyer comprising a belt 15 and supporting rollers 16 arranged to move perpendicularly to the direction of movement of the belts 1 and 12.

The filled cans are moved by the conveyer 15, and as the can comes in line with the upper run of the belt 1, it is engaged by a vane 14, and moved across a supporting plate 16ª to the upper run of the carrier 1, where it is engaged by a stop 5, to properly space it from the other can, and to constrain it to move with the belt.

At the opposite end of the upper run of the belt 1, from the feed belt, the cans are supported between the belts 1 and 2, and at the commencement of the lower run of the belt 1, the cans are delivered in inverted position to the upper run of the belt 2. This belt or conveyer is supported by rollers 17, 18 and 19. The rollers 17 and 18 are arranged at that end of the casing adjacent to the roller 7, the roller 17 being above the roller 7, while the roller 18 is below the said roller. The roller 19 is journaled just below the roller 6, and in the same vertical plane. A plane through the axes of the rollers 17 and 18 is spaced outwardly from the vertical plane through the axis of the roller 7. The arrangement of the rollers 17 and 18 is such that the upper run of the belt must pass to the left of the roller 7 (looking at Fig. 1) and then beneath the said roller to the roller 19. The said upper run would pass in contact with the cans 4, and the cans will be delivered from the upper run of the belt 1 to the upper run of the belt 2, in inverted position. Between the rollers 7 and 19 the upper run of the belt 2 is supported by angle plates 20 corresponding to the plates 9 of the belt 1, the said angle plates having their ends curved downwardly as indicated at 21 in the same manner as the ends of the angle plates 9. The lower run of the belt 2 between the rollers 18 and 19, is supported by supporting and tension rollers 22, similar to the rollers 11 of the belt 1.

The upper run of the belt 2 delivers the cans to what may be called a righting belt or conveyer. Sundry of the stops 3 of the belt 2 have rollers journaled on their ends for moving on the angle plates 20. This belt or conveyer consists of an endless belt 23, supported by a roller 25, journaled between the axes of the rollers 6 and 19 and outwardly with respect thereto, and by rollers 26, arranged below and on each side of the roller 19.

The rollers 25 and 26 are so arranged that a portion of the carrier 23 curves around the roller 19, and moves in contact with the cans upon the belt 2. Thus a portion of the belt 23 extends beneath the roller 19, the said portion being almost horizontal and delivering the righted cans to an endless conveyer 27 similar to the conveyer 15—16, by means of which the cans are delivered from the machine.

At each roller 7 and 19 there is arranged a deflecting guide for the belt 2 and for the belt 23 respectively. Each of these guides consists of a pair of plates 28, the members of each pair being arranged on opposite sides of a fixed support 29, and each of the plates has an arc shaped channel or groove 30 in its inner face of a size to receive the wheels 3, and curved on a center whose center is at the axes of the roller 7 or 19 as the case may be. The plates are adjustably connected with the support by means of bolts 31, which pass through slots in the fixed support in the casing wall, each bolt being engaged by a nut.

Referring to Fig. 1 it will be seen that there are three bolts for each pair of plates, and a considerable degree of adjustment is therefore permitted. The material in the cans is cooked by means of coils 32 of steam pipes, which are arranged below the upper run of the carriers 1 and 2, the said coils being supplied with steam in any suitable or desired manner.

Referring to Fig. 4 it will be seen that each of the coils has one end passing out through the casing as indicated at 33 for connection with a source of steam supply. Adjacent to the vertical portion of the belt 2, there is arranged a spray pipe 34, for spraying steam on the belt 2, just before the said belt engages the open tops of the cans for thoroughly cleaning the belt at this point.

In operation the cans to be cooked and drained are placed upon the feed belt 15 in the usual manner. In succession they are fed to the upper run of the belt 1 by the feed belt 12. Passing over the upper coil of steam pipes the material is partially cooked, and the cans are then reversed, after which they pass over the lower coil, and the process of cooking is completed. The cans are drained thoroughly as they are moved to the upper run of the belt 2, and they are eventually delivered from the casing by the conveyer 27. All of the operation is carried on in the casing, it only being necessary to feed the cans to the conveyer 15, and receive them from the conveyer 27.

It will be noted, referring to Fig. 3, that the edges of the belt 23 engage directly in the grooves 30 of the guides 29, this belt having no slats.

It will be understood that the belts may be of any desired material, and in practice, the belts 1 and 2 will be of woven wire, while the belt 23 will be of canvas or similar material. The belts may be wide enough for six, eight, ten or twelve cans to be fed at each operation, that is, of a width to receive any reasonable number of cans, and the speed of the belt 27 is enough faster than that of the belts 12, 1, 2 and 23 to carry the cans away at the same speed as the belt 15 brings them in. The cooking may be done with live steam as well as with the coil. In practice, the belts 1, 2 and 23 will have sprocket chains at the sides. The chain 2 may have either rollers or sprocket chains.

I claim:

1. A device of the character specified, comprising an endless carrier for supporting the cans, rollers for supporting the carrier with its upper run horizontal, a second endless carrier, rollers for supporting said second carrier with its upper run below the lower run of the first named carrier and with a portion of the said upper run curved about one of the rollers of the first named carrier for receiving the inverted cans from the upper run of the first named carrier, means for slidably engaging said portion of the run and holding it in curved position at the roller, said means being adjustable toward and from the roller.

2. A device of the character specified, comprising an endless carrier for supporting the cans, rollers for supporting the carrier with its upper run horizontal, a second endless carrier, rollers for supporting said second carrier with its upper run below the lower run of the first named carrier and with a portion of the said upper run curved about one of the rollers of the first named carrier for receiving the inverted cans from the upper run of the first named carrier, and means for slidably engaging said portion of the run and holding it in curved position at the roller.

3. A device of the character specified, comprising an endless carrier for supporting the cans, rollers for supporting the carrier with its upper run horizontal, a second endless carrier, rollers for supporting said second carrier with its upper run below the lower run of the first named carrier and with a portion of the said upper run curved about one of the rollers of the first named carrier for receiving the inverted cans from the upper run of the first named carrier, and means for feeding cans in succession to the upper run of the first named carrier at the end remote from said last named roller.

4. A device of the character specified, comprising an endless carrier for supporting the cans, rollers for supporting the carrier with its upper run horizontal, a second endless carrier, rollers for supporting said second carrier with its upper run below the lower run of the first named carrier and with a portion of the said upper run curved about one of the rollers of the first named carrier for receiving the inverted cans from the upper run of the first named carrier, a receiving carrier at the opposite end of the last named carrier from the said last named roller of the first named carrier, and rollers for supporting said last named carrier with a portion thereof curved about the adjacent roller of the second named carrier.

5. A device of the character specified, comprising an endless carrier for supporting the cans, rollers for supporting the carrier with its upper run horizontal, a second endless carrier, and rollers for supporting said second carrier with its upper run below the lower run of the first named carrier and with a portion of the said upper run curved about one of the rollers of the first named carrier for receiving the inverted cans from the upper run of the first named carrier.

6. In a machine of the character specified, a plurality of endless carriers, means for supporting the carriers with a portion of the upper run of one carrier curved about the end of the other carrier for receiving inverted cans from the said carrier.

ARTHUR SCOVILL DAVIES.